(12) United States Patent  
Masticola et al.

(10) Patent No.: US 9,334,051 B2  
(45) Date of Patent: May 10, 2016

(54) APPARATUS FOR SERVICING A DETECTOR OF A FIRE SAFETY SYSTEM

(71) Applicant: Siemens Industry, Inc., Alpharetta, GA (US)

(72) Inventors: Stephen P. Masticola, Kingston, NJ (US); Stavros Zavros, Succasunna, NJ (US); Leslie A. Field, Fair Lawn, NJ (US)

(73) Assignee: Siemens Industry, Inc., Alpharetta, GA (US)

(*) Notice: Subject to any disclaimer, the term of this patent is extended or adjusted under 35 U.S.C. 154(b) by 41 days.

(21) Appl. No.: 14/193,788

(22) Filed: Feb. 28, 2014

(65) Prior Publication Data

US 2015/0246727 A1    Sep. 3, 2015

(51) Int. Cl.
| | |
|---|---|
| B64D 39/02 | (2006.01) |
| B64B 1/06 | (2006.01) |
| B64B 1/40 | (2006.01) |
| B64D 47/08 | (2006.01) |
| B64C 39/02 | (2006.01) |

(52) U.S. Cl.
CPC .......... B64C 39/024 (2013.01); *B64B 1/06* (2013.01); *B64B 1/40* (2013.01); *B64C 2201/022* (2013.01); *B64C 2201/027* (2013.01); *B64C 2201/12* (2013.01); *B64C 2201/127* (2013.01); *B64C 2201/146* (2013.01); *B64D 47/08* (2013.01); *Y10T 29/49721* (2015.01)

(58) Field of Classification Search
CPC ............ B64C 39/024; B64C 2201/12; B64C 2201/024; B64C 2201/022; B64C 2201/127; B64C 2201/027; B64C 2201/146; B64D 47/08; B64B 1/06; B64B 1/40
See application file for complete search history.

(56) References Cited

U.S. PATENT DOCUMENTS

| | | | | |
|---|---|---|---|---|
| 7,587,926 | B2* | 9/2009 | Ackerman | 73/1.02 |
| 2009/0050750 | A1* | 2/2009 | Goossen | 244/76 R |
| 2010/0034424 | A1* | 2/2010 | Goossen | 382/103 |
| 2013/0292512 | A1* | 11/2013 | Erben et al. | 244/1 R |

FOREIGN PATENT DOCUMENTS

DE    102012003190 A1    8/2013

OTHER PUBLICATIONS

Mellinger et al.; "Cooperative Grasping and Transport Using Multiple Quadrotors", GRASP Laboratory, University of Pennsylvania, Philadelphia, PA 19104, US, Jul. 9, 2010. (12 pages)
Mellinger et al.; "Cooperative Grasping and Transport Using Multiple Quadrotors", GRASP Laboratory, University of Pennsylvania, Philadelphia, PA 19104, US, Jul. 9, 2010. (12 pages).

(Continued)

*Primary Examiner* — Tuan C. To  
*Assistant Examiner* — Dale W Hilgendorf (57) ABSTRACT

An apparatus includes an aerial platform which is remotely controlled by an operator using a controller. The apparatus is used to service a detector of a fire safety system. The apparatus includes a frame having a gas canister and a gas delivery cup attached thereto, and a drone attached to the frame which is capable of flying the frame under remote control by the operator. A gripping mechanism for gripping a portion of a detector is provided for servicing the detector.

17 Claims, 8 Drawing Sheets

(56) References Cited

OTHER PUBLICATIONS

Cooperative Grasping and Transport Using Quadrotors, TheDmel, YouTube (Jul. 9, 2010), http://www.youtube.com/watch?v=YBsJwapanWI&list=PLyFUenSXDy8sQPVLnj5TDSZJQPbDDGMfU&index=1, (3 screen shots from cited You Tube video).

Flying Robots, the Builders of Tomorrow, Reuters, Dec. 2, 2011, http://www.youtube.com/watch?v=xvN9Ri1GmuY&list=PLyFUenSXDy8sQPVLnj5TDSZJQPbDDGMfU&index=2, (4 screen shots from cited You Tube video).

A Swarm of Nano Quadrotors, The Dmel, Jan. 31, 2012, http://www.youtube.com/watch?v=w2itwFJCgFQ&list=PLyFUenSXDy8sQPVLnj5TDSZJQPbDDGMfU&index=4, (4 screen shots from cited You Tube video).

D'Andrea, Raffaello, "The Astounding Athletic Power of Quadcopters", TED Talks, Jun. 11, 2013, http://www.youtube.com/watch?v=w2itwFJCgFQ&list=PLyFUenSXDy8sQPVLnj5TDSZJQPbDDGMfU&index=4, (5 screen shots from cited You Tube video).

Aggressive Maneuvers for Autonomous Quadrotor Flight, TheDmel, May 21, 2010, http://www.youtube.com/watch?v=MvRTALJp8DM&list=PLyFUenSXDy8sQPVLnj5TDSZJQPbDDGMfU&index=5, (3 screen shots from cited You Tube video).

Real Swarm of Flying Nano Quadrotors Doing Flight Tricks HD, Feb. 1, 2012, http://www.youtube.com/watch?v=QmWD76jwjbQ&list=PLyFUenSXDy8sQPVLnj5TDSZJQPbDDGMfU&index=6, (4 screen shots from cited You Tube video).

* cited by examiner

APPARATUS FOR SERVICING A DETECTOR OF A FIRE SAFETY SYSTEM

FIELD OF THE INVENTION

The present invention relates to an apparatus for inspecting, testing and servicing a detector, such as smoke or carbon monoxide detector, in a fire safety system.

BACKGROUND OF THE INVENTION

Fire safety systems, such as smoke/fire detectors, are often mounted on high ceilings or are mounted in inaccessible places. As a result, it is difficult, time-consuming and expensive for test technicians to reach these detectors to test the functionality. Currently, test technicians build scaffolding or ride bucket lifts to access the detector, or test technicians gain entry to difficult or dangerous access points to access the detector. Building scaffolding is expensive and time intensive to build. Bucket lifts are also expensive to use, and require two operators which increases the cost of this methodology. When multiple detectors must be inspected in one location, these prior art methods are inefficient.

A mechanism for inspecting and testing fire safety systems is provided herein which provides improvements to existing methodology and which overcomes the disadvantages presented by the prior art. Other features and advantages will become apparent upon a reading of the attached specification, in combination with a study of the drawings.

SUMMARY OF THE INVENTION

An apparatus includes an aerial platform which is remotely controlled by an operator using a controller. The apparatus is used to service a detector of a fire safety system. The apparatus includes a frame having a gas canister and a gas delivery cup, preferable formed as a cone, attached thereto, where the gas canister is in fluid communication with the gas delivery cup. The apparatus also includes a drone attached to the frame which is capable of flying the frame under remote control by the operator to position the gas delivery cup in proximity to or to seat over a detector to facilitate testing the detector with gas dispensed from the gas canister via the gas delivery cup. A gripping mechanism for gripping a portion of a detector is provided for servicing the detector.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

Figure 1:
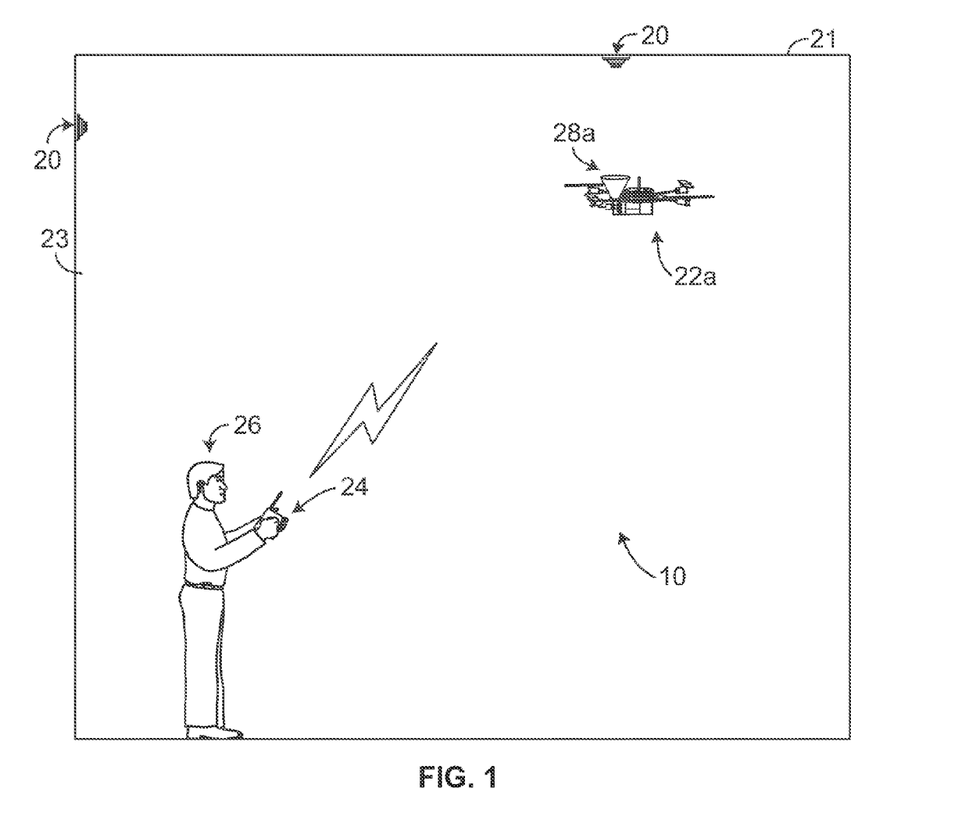
FIG. 1 shows an apparatus which incorporates the features of the present invention, where the apparatus is shown during operation relative to a detector to be serviced.

An apparatus 10 for inspecting and testing a detector 20 of a fire safety system from a location remote from the detector 20 is provided. As depicted in FIG. 1, the apparatus 10 is used to test and service a smoke detector or a carbon monoxide detector 20 in an inaccessible location, such as a detector 20 mounted on a very high ceiling 21, high on a wall 23, or in a dangerous location. Detectors 20 for a fire safety system are known in the art. Thus, to avoid obscuring features and aspects of the present invention and for brevity, the details of the detectors 20 and other conventional components of a fire safety system, such as a fire panel that is electrically connected to detectors 20 for controlling and receiving detection signals from the detectors 20, are not described herein.

First and second embodiments of the apparatus 10 include a small remote-controlled multi-axis-stabilized aerial platform 22a, 22b and a controller 24 which is operated by an operator 26 in communication with the aerial platform 22a, 22b. The controller 24 may be hand-held. A single operator 26 may operate the apparatus 10. The aerial platform 22a, 22b has a gas delivery system 28a, 28b provided thereon for delivery of test gas or test smoke to the detector 20 in accordance with the present invention.

Figure 3:
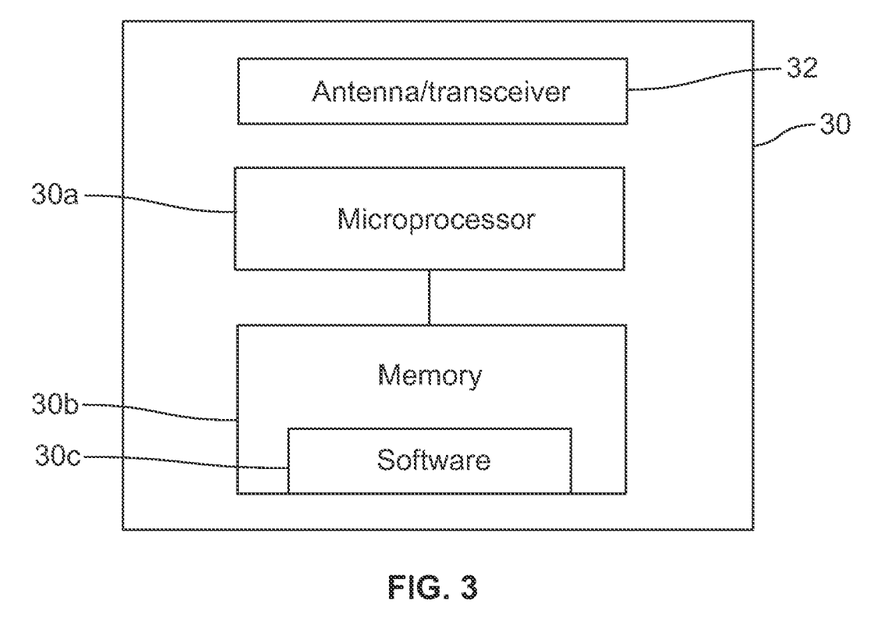
FIG. 3 is a schematic block diagram view of the electronics of the controller of FIG. 2.

As best shown in FIG. 3, the controller 24 includes electronics 30, such as a microprocessor 30a, memory 30b that hosts an aerial platform control software program 30c run by the microprocessor 30a for generating instructions or control signals based on pre-defined or operator provided inputs for operating the aerial platform 22a, 22b. The electronics 30 may also include a wireless transceiver and an antenna (collectively referenced as 32) for wirelessly conveying the generated instructions or control signals to the aerial platform 22a, 22b. The controller 24 may include a display screen 34, and an input device 36, such as a keyboard, a joy stick or a touch screen, for inputting commands into the controller 24 for processing by the microprocessor 30a of the electronics 30 to operate the aerial platform 22a, 22b. The display screen 34 is operatively connected to and controlled by the microprocessor 30a of the electronics 30 to display feedback of operator input commands and images or a video stream received via the transceiver and antenna 32 from a camera 48 mounted on the aerial platform 22a, 22b to the operator 26 to aid in servicing a detector 20 as furthered explained herein. The electronics 30 may also include a power source (not shown in the drawings), such as one or more batteries, for supplying power to the components of the electronics 30.

Figure 5:
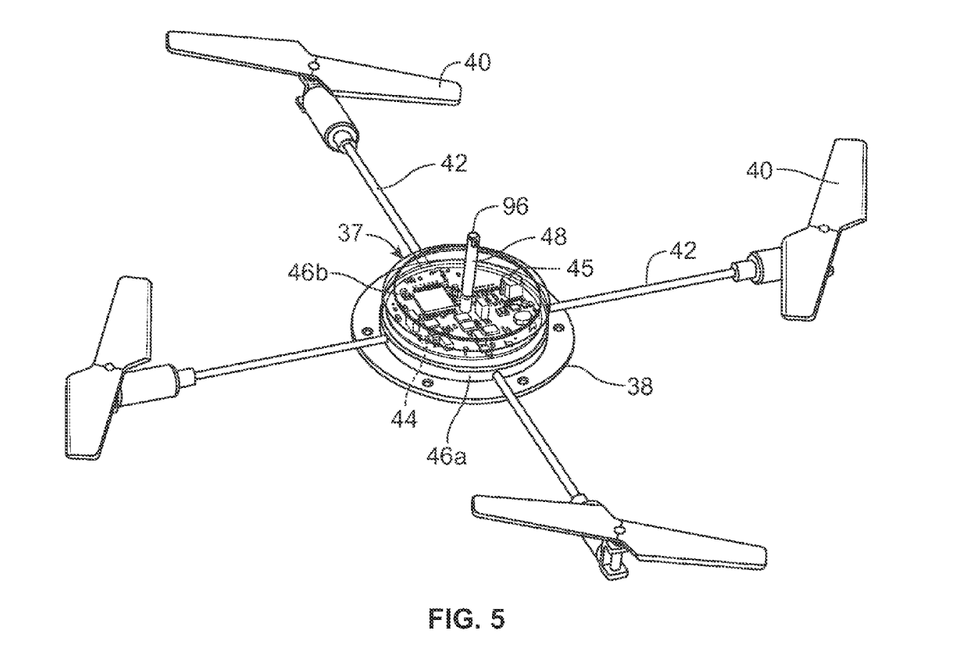
FIG. 5 is a perspective view of a drone used in each of the embodiments of the present invention.

The small remote-controlled multi-axis-stabilized aerial platform 22a, 22b of the first and second embodiments includes a drone 37, which is best illustrated in FIG. 5, which enables the aerial platform 22a, 22b to fly under command of the controller 24 based on input commands from the operator 26. In these embodiments, the drone 37 includes a chassis 38 having one or more battery-driven motors and propeller blades 40 thereon, and a control and communications electronics package 44 mounted thereon.

Each blade 40 is connected to the chassis 38 by a strut 42, such that the blades 40 are spaced from and about the chassis 38. The blades 40 may be disposed to rotate in the same plane or parallel to a plane formed by the struts 42 when connected to and extending from the chassis 38 as depicted in FIGS. 5-9. As shown in the drawings, four blades 40 are provided, however, more or fewer blades may be provided so long as the aerial platform 22a, 22b is stabilized when the blades 40 are operated in unison. Preferably, the aerial platform 22a, 22b is formed of a quad-copter or hex-copter.

Figure 4:
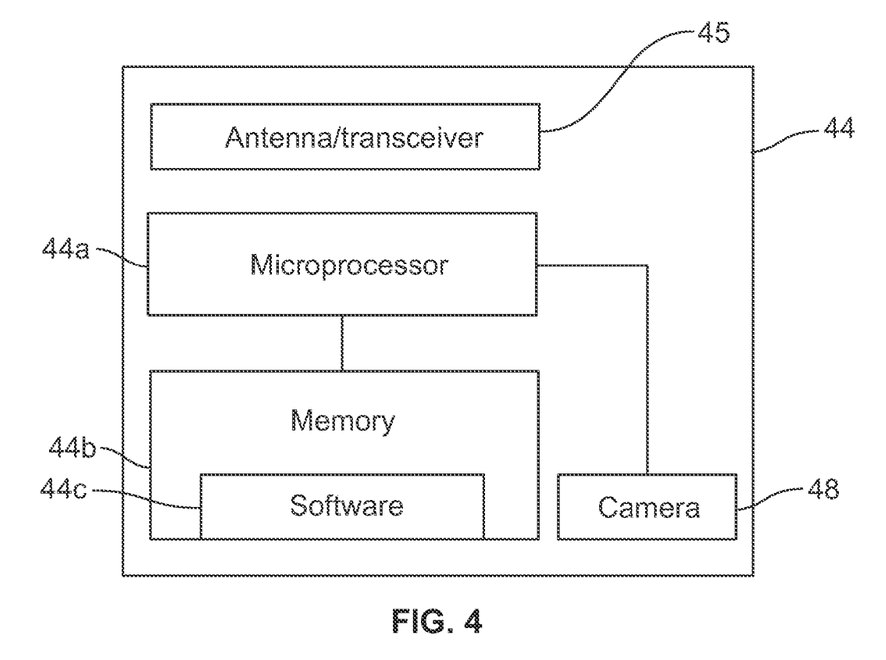
FIG. 4 is a schematic block diagram view of electronics in the aerial platform.

As best shown in FIG. 4, the electronics package 44 on the drone 37 includes a microprocessor 44a, memory 44b that hosts an aerial platform control software program 44c run by the microprocessor 44a for generating instructions or control signals based upon instructions or control signals received from the controller 24 for operating the motors and propeller blades 40. The electronics package 44 on the drone 37 further may include a camera 48 which is in communication with the microprocessor 44a. The electronics package 44 may also include a power source (not shown in the drawings), such as one or more batteries, for supplying power to the components of the electronics package 44, motor and blades 40, and the camera 48. The electronics package 44 includes a wireless transceiver and an antenna (collectively referenced as 45) for wirelessly receiving the instructions or control signals from the controller 24 and for sending images or a video stream from the camera 48 to the controller 24 for viewing by the operator 26 on the display screen 34. The electronics package 44 controls the operation of the motors and blades 40 upon receiving wireless instructions or control signals from the controller 24 based on input commands from the operator 26 for flying and operating the aerial platform 22a, 22b.

The electronics package 44 is mounted in a housing 46a, 46b mounted on the chassis 38. The camera 48 may be mounted on the chassis 38 and is in communication with the electronics package 44 for wirelessly transmitting images or video to the controller 24 when the aerial platform 22a, 22b is powered on.

In each embodiment, a frame 50a, 50b is attached to the chassis 38, preferably by fasteners extending through the frame 50a, 50b and the chassis 38, or by welding the frame 50a, 50b and the chassis 38 together. The frame 50a, 50b is larger than the chassis 38. The camera 48 may be mounted on the chassis 38. The gas delivery system 28a, 28b is mounted on the frame 50a, 50b and includes a gas delivery cup 52 connected to a gas canister 54. The gas delivery cup 52 has a wall 56 having a central passageway therethrough with open ends 56a, 56b. A central axis 53 is defined through the gas delivery cup 52. The gas delivery cup 52 is preferably shaped as a cone with a smaller open end 56a and a larger open end 56b.

Figure 6:
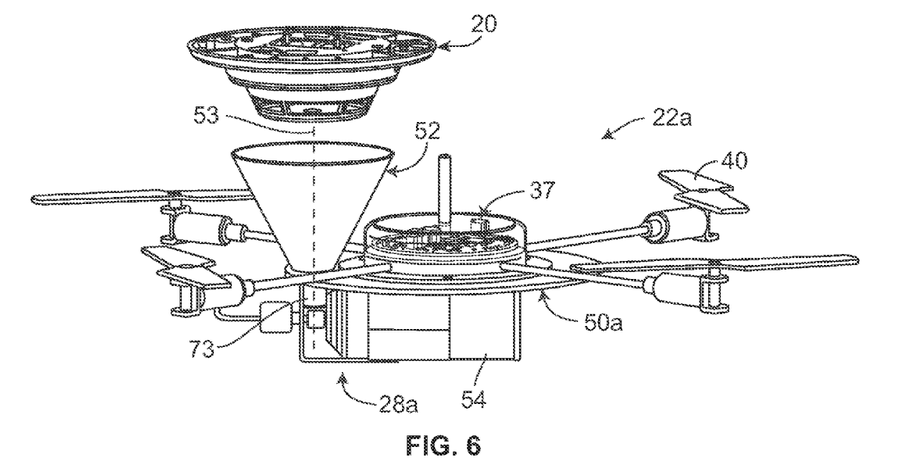
FIG. 6 is a perspective view of a first embodiment of an aerial platform which may be used in the present invention.
Figure 7:
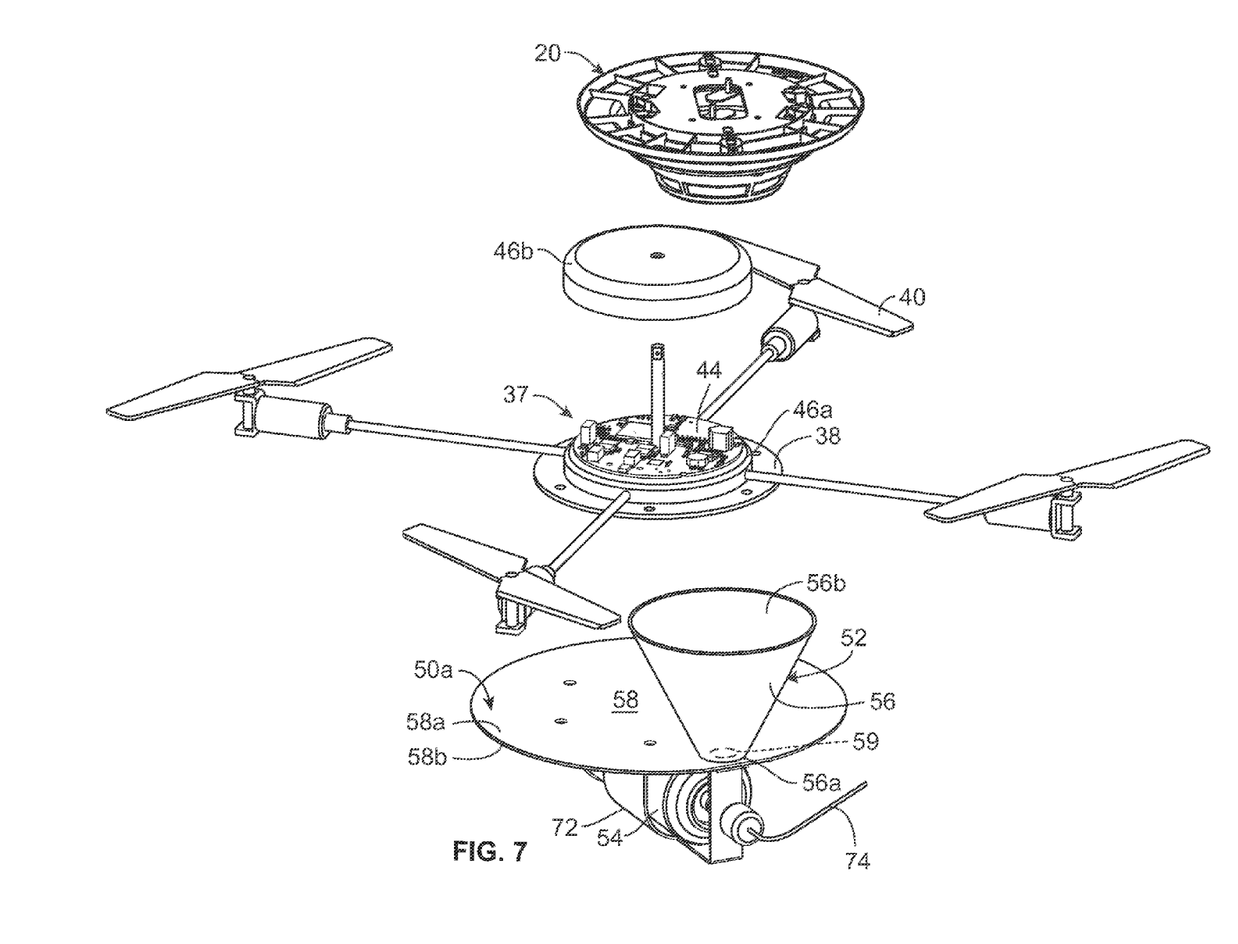
FIG. 7 is an exploded perspective view of the first embodiment of the aerial platform.

In the first embodiment shown in FIGS. 6 and 7, the frame 50a has a planar horizontal base wall 58 having an upper surface 58a and a lower surface 58b. The base wall 58 has a larger width or diameter than the chassis 38, such that the chassis 38 is seated on and covers a portion of the upper surface 58a of the wall 58. The gas delivery cup 52 is seated on the upper surface 58a of the wall 58 on another portion thereof that is not covered by the chassis 38 and is mounted between the struts 42, such that the gas delivery cup 52 extends upwardly from the wall 58 so that the larger open end 56b is above each of the blades 40 and turbulence from the rotating blades 40 is inhibiting from affecting the delivery of gas through the gas delivery cup 52 out of the larger open end 56b. The gas delivery cup 52 may be vertically mounted on the frame 50a such that the central axis 53 of the gas delivery cup 52 is perpendicular to the plane of the upper surface 58a of the wall 58 of the frame 50a. The smaller open end 56a of the gas delivery cup 52 mates with the frame 50a. An aperture 59 is provided through the frame 50a and is surrounded by the end of the gas delivery cup 52 when the gas delivery cup 52 is mounted to the frame 50a.

Figure 8:
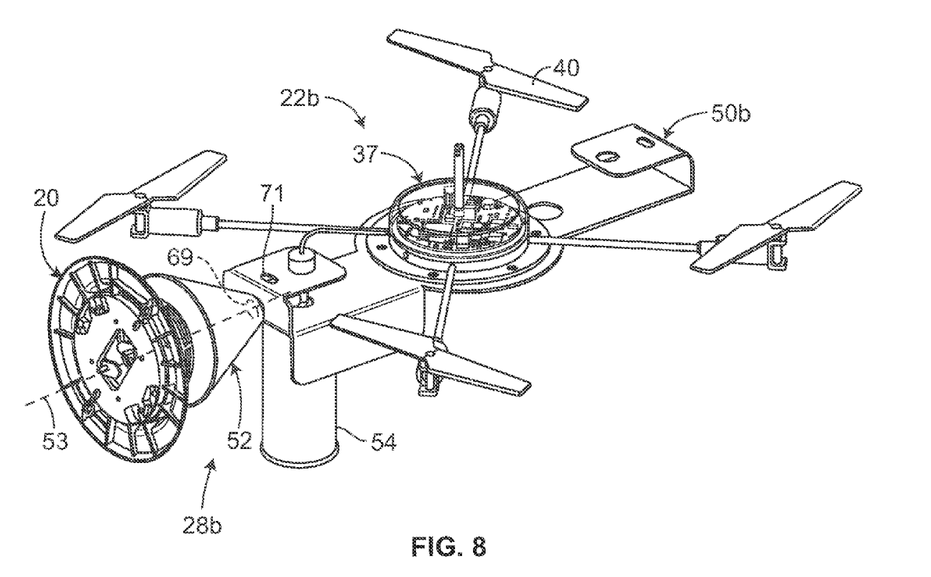
FIG. 8 is a perspective view of a second embodiment of an aerial platform which may be used in the present invention.
Figure 9:
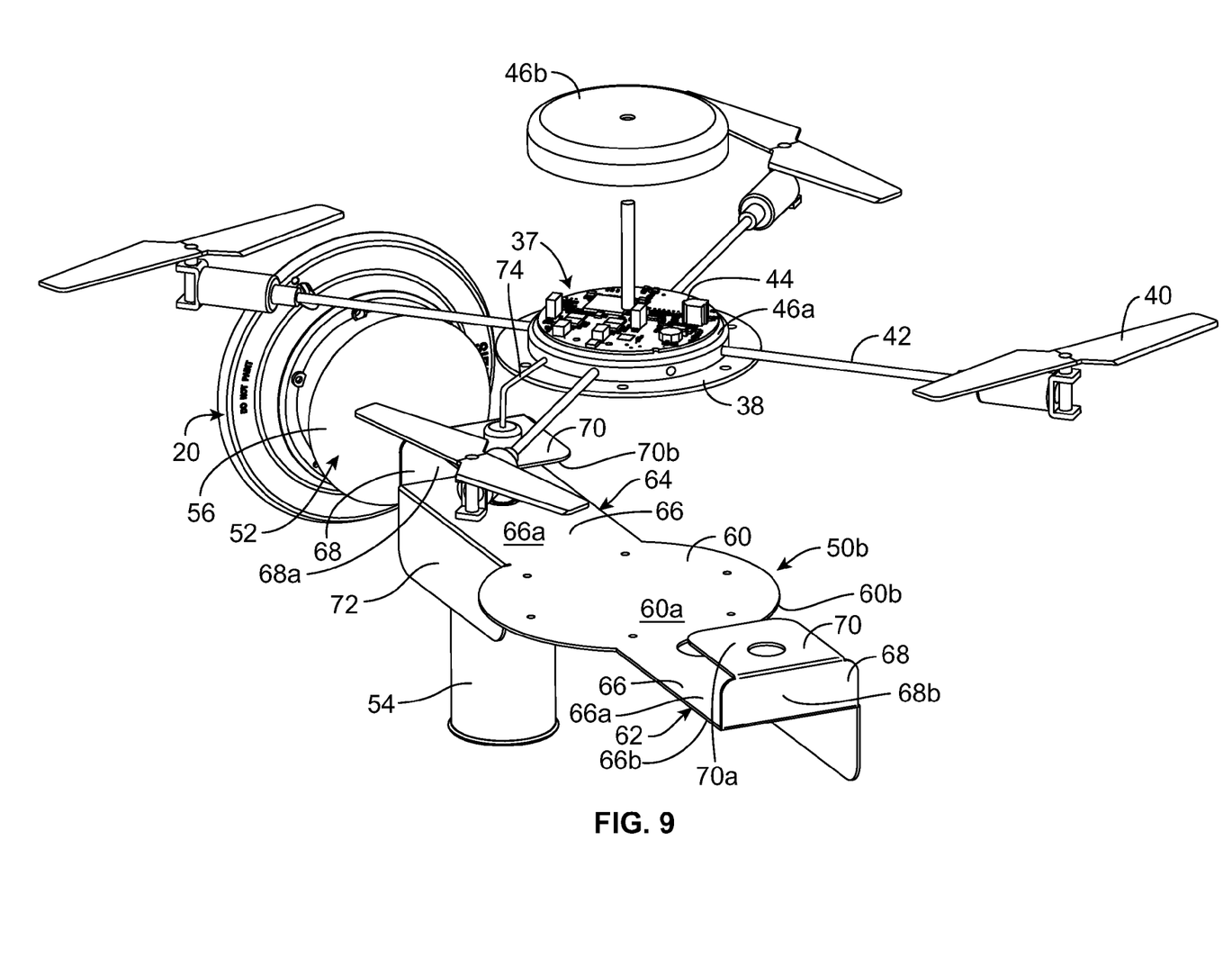
FIG. 9 is an exploded perspective view of the second embodiment of the aerial platform.

In the second embodiment shown in FIGS. 8 and 9, the frame 50b includes a planar horizontal base wall 60 which has a pair of arms 62, 64 extending therefrom. The base wall 60 has an upper surface 60a and a lower surface 60b. As shown in FIG. 9, each arm 62, 64 has a first horizontal wall 66, having an upper surface 66a and a lower surface 66b, which extends outwardly from and in the same plane as the base wall 60, a vertical wall 68, having an inner surface 68a and an outer surface 68b, which extends upwardly from an end of the first horizontal wall 66 of the respective arm 62, 64, and a second horizontal wall 70, having an upper surface 70a and a lower surface 70b, which extends from an upper end of the vertical wall 68 of the arm 62, 64. The chassis 38 is seated on the upper surface 60a of the base wall 60 and the struts 42 extend outwardly from the chassis 38 such that the arms 62, 64 each extend between adjacent struts 42. With this frame 50b, the gas delivery cup 52 may be mounted on the outer surface 68b of one of the vertical walls 68 of the arms 62, 64 so that the gas delivery cup 52 is horizontally mounted relative to the plane formed by the struts 42 and where the central axis 53 of the gas delivery cup 52 is substantially perpendicular to the outer surface of the one vertical wall 68. In this embodiment, the gas delivery cup 52 extends outwardly from the wall 68 so that the larger open end 56b is radially outwardly positioned relative to the blades 40, and turbulence from the rotating blades 40 is inhibiting from affecting the delivery of gas through the gas delivery cup 52 out of the larger open end 56b. This embodiment of the aerial platform 22b of the apparatus 10 is effective for servicing or delivering gas to a detector 20 mounted on a side wall 23 of a room for the purpose of testing the capability of the detector 20 for sensing the gas and communicating the detection of the gas to the corresponding fire safety system.

Alternatively, the gas delivery cup 52 may be mounted on the upper surface 70a of one of the horizontal walls 70 such that the gas delivery cup 52 is vertically mounted relative to the plane formed by the struts 42 and where the central axis 53 of the gas delivery cup 52 is substantially perpendicular to the upper surface 70a of the horizontal wall 70 like that of the first embodiment shown in FIG. 6. In this embodiment, the gas delivery cup 52 extends upwardly from the wall 70 so that the larger open end 56b is above each of the blades 40 and turbulence from the rotating blades 40 is inhibiting from affecting the delivery of gas through the gas delivery cup 52 out of the larger open end 56b. This embodiment of the aerial platform 22b of the apparatus 10 is effective for servicing or delivering gas to a detector 20 mounted on a ceiling 21 of a room for the purpose of testing the capability of the detector 20 for sensing the gas and communicating the detection of the gas to the corresponding fire safety system.

In whichever position is chosen for the gas delivery cup 52 to be mounted on the frame 50b, the smaller open end 56a of the gas delivery cup 52 mates with the wall 68, 70 so that an aperture 69, 71 provided through the wall 68, 70 is surrounded by the end of the gas delivery cup 52.

In each embodiment, the frame 50a, 50b has a holding bracket 72 attached thereto which the canister 54 is mounted. With frame 50a, the holding bracket 72 is preferably attached to the lower surface 58b of the wall 58; with frame 50b, the holding bracket 72 is preferably attached to the lower surface 66b of the wall 66. The holding bracket 72 may be formed of a U-shaped bracket. When the gas in the canister 54 has been depleted, the canister 54 may be removed from the holding bracket 72 and replaced by a new canister. A hose 73 is connected between the canister 54 and the gas delivery cup 52, via the respective aperture 59, 69, 71 in the frame 50a, 50b, such that the canister 54 is in fluid communication with the gas delivery cup 52 and able to deliver gas from the canister 54 to the gas delivery cup 52 as described herein. The connections between the hose 73 and the canister 54 and the hose 73 and the respective aperture 59, 69, 71 are sealed to prevent leakage. The canister 54 includes a valve which may be actuated by the electronics package 44 to release gas from the canister 54 upon wirelessly receiving a corresponding instruction or control signal from the controller 24 in response to a corresponding input command from the operator 26. To effect this control, suitable wiring 74 is provided between the canister 54 and the electronics package 44. Mechanisms for electronically controlling valves of a gas container (and that may be employed in the electronics package 44 to electronically control the valve of the canister 54) are disclosed in U.S. Pat. No. 6,769,285, the disclosure of which is incorporated herein in its entirety.

Figure 10:
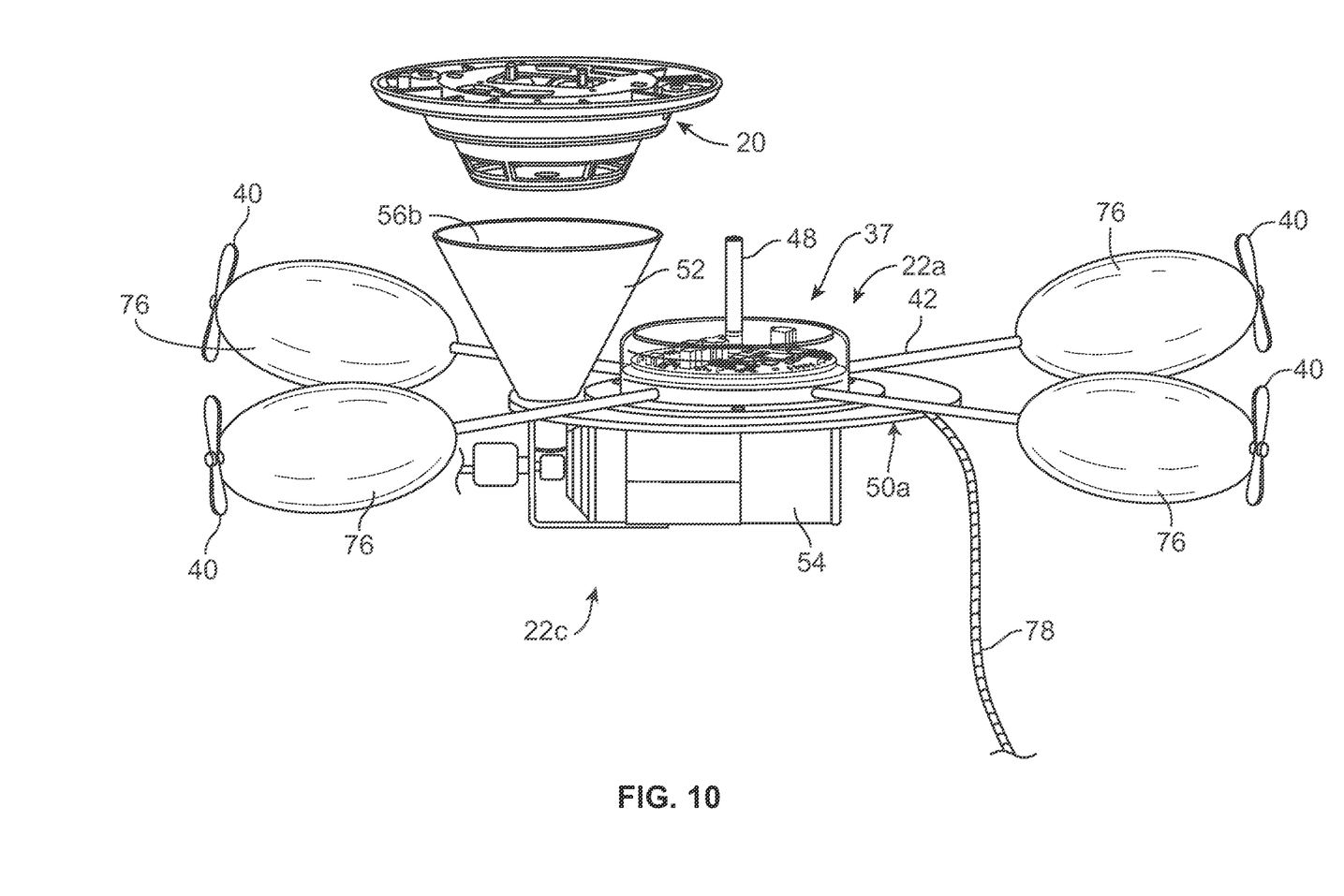
FIG. 10 is a perspective view of a third embodiment of an aerial platform which may be used in the present invention.

A third embodiment of the aerial platform 22c shown in FIG. 10 is identical to the first and second embodiments, with the exceptions described herein. The aerial platform 22c includes balloons or dirigible gas envelopes 76 having the battery-driven motors and blades 40 provided thereon to provide a lighter-than-air aerial platform. The blades 40 may be disposed to rotate in a plane which is perpendicular to the plane formed by the struts 42 when connected to and extending from the chassis 38 as depicted in FIG. 10.

The aerial platform 22c may be directed by the operator using a tether 78 (lighter-than-air) or guided by the motors with blades 40 (hybrid lighter-than-air). The motors of the blades 40 are in electrical communication with the electronics package 44 and are controlled by the electronics package 44. With the embodiment using the motors and blades 40, a longer battery life is achieved, since the balloons or dirigible gas envelopes 76 are the primary means for keeping the aerial platform 22c aloft, and the batteries are only used when the motors and blades 40 are engaged to turn, raise or lower the aerial platform 22c. In addition, since the motors and blades 40 are not constantly engaged as the aerial platform 22c can float using the balloons or dirigible gas envelopes 76, this may result in a more reliable application of the test gas delivery by the aerial platform 22c, because less or no turbulence is generated by the blades 40.

In use, the operator 26 arrives to a field site and prepares the aerial platform 22a, 22b, 22c for use. Using the controller 24, the operator 26 directs the aerial platform 22a, 22b, 22c to a high or otherwise inaccessible detector 20 and uses it to inspect and perform a "walk test" of the detector 20. Using the input device 36 of the controller 24, the operator 26 may prompt the controller 24 to wirelessly transmit instructions or control signals to the electronics package 44 of the aerial platform 22a, 22b, 22c to position the camera 48 of the aerial platform 22a, 22b, 22c to point at a high ceiling or wall that has detectors to test. In one embodiment, the operator 26 may solely visually position the aerial platform 22a, 22b, 22c in position in proximity to the detector 20 to be tested. In another embodiment, the operator 26 may look at the images or video from the camera 48 to position the aerial platform 22a, 22b, 22c in position in proximity to the detector 20 to be tested. In another embodiment, the aerial platform control program performed by the microprocessor 30a of the controller 24 may include an image analysis module that uses conventional image processing techniques to recognize and isolate a detector 20 in a frame of an image or video received from the camera 48. The aerial platform control program may further include a user display interface module that displays each recognized detector 20 on the display screen 34 for selection by the operator 26. The operator 26 may select or designate the detector 20 on the controller's display screen 34 using a pointing device, such as a mouse or a touchscreen. Based on a corresponding input command received from the operator 26 via the input device 36, the controller 24 automatically guides the aerial platform 22a, 22b, 22c to the detected detector based on the derived flight path.

When the aerial platform 22a, 22b, 22c is flown up to the detector 20 in accordance with the embodiments described herein, the aerial platform 22a, 22b, 22c may be guided to position the gas delivery cup 52 over the detector 20 by the motors and propeller blades 40 or the by the balloons or dirigible gas envelopes 76/motors and blades 40. The aerial platform 22a, 22b, 22c is controlled and stabilized by the electronics package 44. In one embodiment the stabilization process performed by the electronics package 44, may include having the camera 48 continuously send images or a video stream to the controller 24 for display on the display screen 34 and observation thereof by the operator 26. In this embodiment, with the continuous display on the controller 24 of images or video from the camera 48 as mounted on the aerial platform 22a, 22b, 22c, the operator 26 is able to use the input device 36 of the controller 24 to more effectively maneuver and position the aerial platform 22a, 22b, 22c in the desired test or service position relative to the detector 20. When the aerial platform 22a, 22b, 22c is flown or guided to the test or service position, the larger open end 56b of the gas delivery cup 52 seats over the detector 20 such that the gas delivery cup 52 abuts against the ceiling 21 or wall 23 to which the detector 20 is attached. As such, the detector 20 is encapsulated within the gas delivery cup 52. On command from the operator 26 via the controller 24, the electronics package 44 of the aerial platform 22a, 22b, 22c actuates the valve of the canister 54 to release gas into the gas delivery cup 52 from the canister 54 via the hose 73. The gas delivery cup 52 substantially prevents escape and waste of test gas during testing. The aerial platform 22a, 22b, 22c remains in position without operator intervention until the test is complete. The electronics package 44 may receive a control signal from the controller 24 to identify that the test is complete. In another embodiment, the electronics package 44 may include a timer set to count up to or down from a pre-defined test period. In this embodiment, the electronics package 44 may activate the timer when the control signal is received to actuate the valve of the canister 54 for the release of gas; after the timer is activated, the electronics package 44 is able to recognize when the time of the timer has counted up to or down from the pre-defined test period to determine or identify that the test is completed. When the test is completed, the electronics package 44 may perform a disengage flight control sequence to cause the aerial platform 22a, 22b, 22c to automatically (i) drop slightly to move the gas delivery cup 52 a pre-determined distance (such as 1-12 inches) away from the detector 20 that was tested and enable the operator 26 to designate the next detector 20 to test, or (ii) return to and land in proximity of the controller 24 or operator 26.

Figure 2:
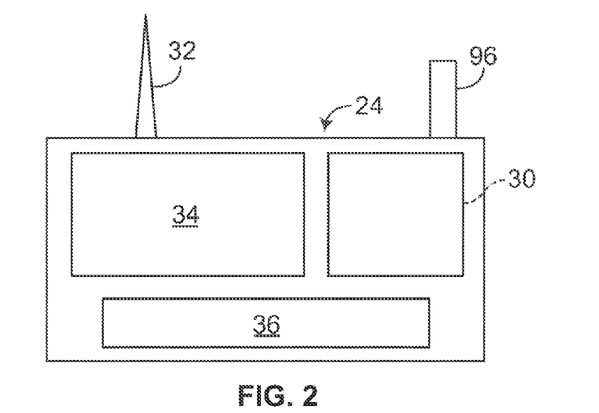
FIG. 2 is a schematic block diagram view of a controller of the apparatus that may be used to control an aerial platform of the apparatus to service the detector in accordance with the present invention.

As shown in FIG. 2, the controller 24 may include a laser designator 96 which is in communication with the microprocessor 30a. The laser designator 96 is used to generate a collimated beam of light. The operator 26 focuses the collimated beam from the laser designator 96 on the detector 20 to be serviced. In this embodiment, the camera 48 on the drone 37 may include a photoelectric sensor for detecting the light beam when reflected from the detector 20 and transmitting the detected light beam via the electronics package 44 with a corresponding image or video from the camera 48 to the controller 24. Upon receipt by the controller 24 of the detected light beam, an image analysis module of the aerial platform software 44c is able to use conventional image processing techniques to recognize the detector 20 in the corresponding received frame of the image or video received from the camera 48 and derive a flight path to the detector 20 for the aerial platform 22a, 22b, 22c based on the detected detector 20 associated with the detected light beam and corresponding image or video received from the camera 48. Based on a corresponding input command received from the operator 26 via the input device 36, the controller 24 automatically guides the aerial platform to the detected detector based on the derived flight path.

Alternatively, as shown in FIG. 5, the laser designator 96 can be mounted on the electronics package 44 on the drone 37 which is in communication with the microprocessor 44a. When the aerial platform 22a, 22b, 22c is flown by the operator 26 in proximity of the detector 20 to be serviced, the photoelectric sensor on the camera 48 detects the light beam when reflected from the detector 20 and transmitting the detected light beam via the electronics package 44 with a corresponding image or video from the camera 48 to the controller 24. Upon receipt by the controller 24 of the detected light beam, the image analysis module of the aerial platform software 44c is able to use conventional image processing techniques to recognize the detector 20 in the corresponding received frame of the image or video received from the camera 48 and derive a flight path to the detector 20 for the aerial platform 22a, 22b, 22c based on the detected detector 20 associated with the detected light beam and corresponding image or video received from the camera 48. Based on a corresponding input command received from the operator 26 via the input device 36, the controller 24 automatically guides the aerial platform to the detected detector 20 based on the derived flight path.

As discussed, the operator 26 may manually fly the aerial platform 22a, 22b, 22c to the detector location using the controller 24. Alternatively, the controller 24 may be set via the input device 36 to an "autopilot" mode which is part of the software programs 30c, 44c. In this situation, the operator 26 programs the controller 24 with the location of the detector 20, and then the aerial platform 22a, 22b, 22c automatically flies to the detector 20 location and positions itself relative to the detector 20 for testing. Such programming may be effected by various means, such as illuminating the detector 20 with the laser designator 96, identifying the detector 20 on the display screen 34, or programming the precise position of the detector 20 into the controller 24 which transmits this information to the electronics package 44 on the aerial platform 22a, 22b, 22c.

Figure 11:
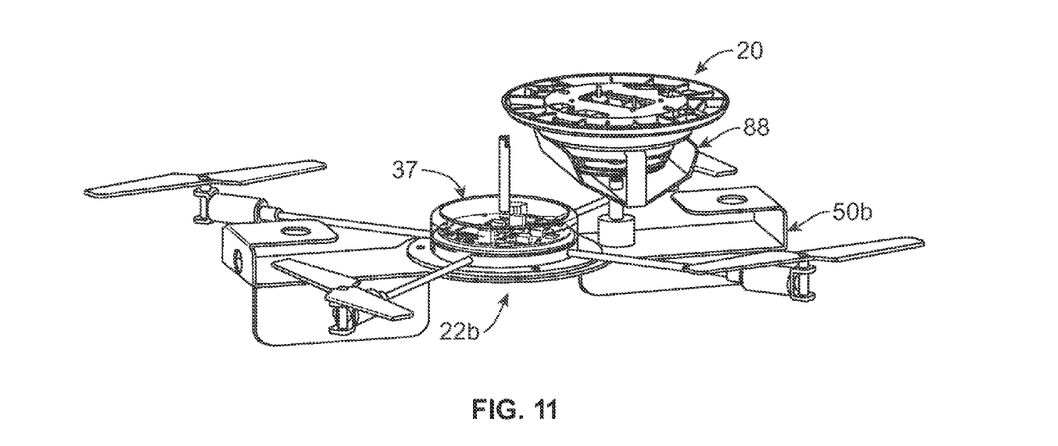
FIG. 11 is a perspective view of the second embodiment of the aerial platform with a gripping mechanism attached thereto.
Figure 12:
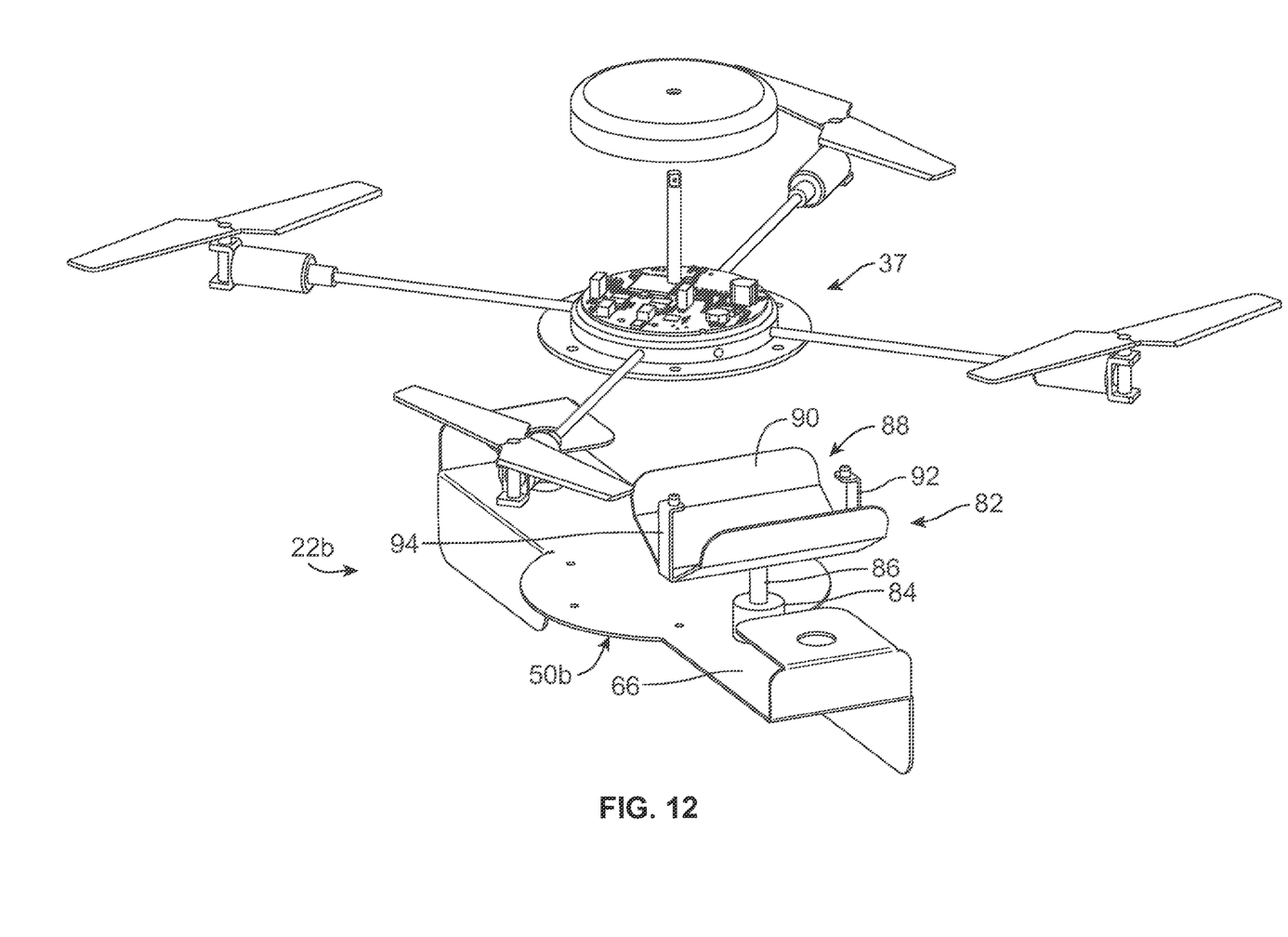
FIG. 12 is an exploded perspective view of the embodiment of FIG. 11.

FIGS. 11 and 12 show a gripping mechanism 82 which may be attached to the aerial platform 22b. The gripping mechanism 82 is used to service a detector 20 as described herein. While the gripping mechanism 82 is shown attached to the aerial platform 22b, it is to be understood that the gripping mechanism 82 may be attached to aerial platforms 22a, 22c. The gripping mechanism 82 is mounted on the frame 50b. It is to be understood that the gas delivery system 28a, 28b shown in the first and second embodiments, while not shown in FIG. 11, may be provided on the frame 50a, 50b with the gripping mechanism 82.

The gripping mechanism 82 includes a motor 84 having a shaft 86 extending therefrom. The motor 84 may be driven by an electromagnetic clutch operatively connected to and actuated by the electronics package 44. A platform 88 is seated on the end of the shaft 86 and has a seat 90 which form a generally V-shape, and a pair of moveable arms 92, 94 mounted to opposite ends of the seat 90. The arms 92, 94 may be operatively connected to and actuated by the electronics package 44 to collapse around and engage the detector 20. When the aerial platform 22b is proximate to the detector 20, the operator 26 using the input device 36 of the controller 24 commands the electronics package 44 of the aerial platform 22a, 22b, 22c to simultaneously actuate the arms 92, 94 to collapse and engage the detector 20 to firmly grip the detector 20. The operator 26 via the controller 24 in communication with the electronics package 44 of the aerial platform 22a, 22b, 22c causes the electronics package 44 to actuate the electromagnetic clutch and drive the motor 84 to rotate the platform 88 and apply torque to a removable portion of the detector 20, which causes the removable portion of the detector 20 to disengage from a base of the detector 20 which remains mounted to the ceiling 21 or to the wall 23. Using the controller 24 as described herein, the operator 26 may then command the aerial platform 22a, 22b, 22c to fly back and return to the controller 24 or the operator 26. The detector 20 (or removable portion thereof) may be removed from the platform 88 of the aerial platform 22a, 22b, 22c by the operator 26 after using the controller 24 to command the electronics package 44 to de-actuate or disengage the arms 92, 94 from the detector 20. The operator 26 may then use the controller 24 to command the electronics package 44 to actuate or engage the arms 92, 94 to a new detector so that the new detector is engaged with the platform 88 of the aerial platform 22a, 22b, 22c. The aerial platform 22a, 22b, 22c is then flown by the operator 26 using the controller 24 in wireless communication with the electronics package 44 of the aerial platform 22a, 22b, 22c to the appropriate or last location of the removed detector as described herein, and to engage the new detector or the new detector portion with the base. When the aerial platform 22a, 22b, 22c is proximate to the detector 20, the operator 26 using the controller 24 commands the electronics package 44 of the aerial platform 22a, 22b, 22c to engage the motor 84 to rotate the platform 88 in the opposite direction which causes the new detector portion to engage with the base to secure the new portion of the detector 20 to the base. After the detector 20 is reassembled, the operator 26 commands using the controller 24 commands the electronics package 44 of the aerial platform 22a, 22b, 22c to de-actuate the arms 94, 94 to expand and disengage from the detector 20. At this point, the aerial platform 22a, 22b, 22c may be maneuvered to position the gas delivery cup 52 over the new detector to test it consistent with the methods and embodiments of the apparatus 10 described herein. Thereafter, the aerial platform 22a, 22b, 22c may be configured to automatically return to the controller 24 or the operator 26.

Alternate implementation of gripping mechanisms 82 are within the scope of the invention. For example, drive wheels or treads may be employed by the aerial platform 22a, 22b, 22c to engage against the ceiling 21 or wall 23 to apply torque, in combination with a single rotating gripper to apply torque to the detector 20.

The apparatus of the present invention eliminates the need to install and remove expensive scaffolding, and eliminates the need for bucket lifts and its associated second operator. The apparatus of the present invention enables faster inspections of inaccessible detectors 20. The operator 26 may more quickly move between detectors 20 to be tested, thereby saving labor cost.

While preferred embodiments of the present invention is shown and described, it is envisioned that those skilled in the art may devise various modifications of the present invention without departing from the spirit and scope of the appended claims.

What is claimed is:

1. An aerial platform for servicing a detector comprising:
a frame;
a gas canister attached to the frame, the gas canister having gas therein;
a gas delivery cup seated directly on and affixed to the frame and in fluid communication with the gas canister, wherein gas from the gas canister is capable of being selectively released into the gas delivery cup to test the detector; and
a drone attached to the frame, the drone capable of flying the frame under remote control by an operator to the detector.

2. The aerial platform of claim 1, wherein the drone has a control and communications electronics package for receiving instructions from the operator.

3. The aerial platform of claim 1, further including a camera mounted on one of the frame and the drone for providing images and/or video to the operator.

4. The aerial platform of claim 3, wherein the drone has a control and communications electronics package for said receiving said images and/or video, said control and communications electronics package using said images and/or video to maneuver the aerial platform proximate to the detector.

5. The aerial platform of claim 4, further including a laser designator on said drone and in communication with said control and communications electronics package.

6. The aerial platform of claim 1, wherein the drone comprises a plurality of motors and rotatable blades attached thereto for flying the frame, and the gas delivery cup has an open end that extends upwardly from the frame so that the open end is above each of the blades of the drone.

7. The aerial platform of claim 6, further including a tether attached to the frame to direct the frame to a desired location.

8. The aerial platform of claim 1, wherein the drone comprises a plurality of motors and rotatable blades attached thereto for flying the frame, and the gas delivery cup has an open end that is radially outwardly from the blades of the drone.

9. The aerial platform of claim 1, further including a gripping mechanism for gripping a portion of the detector.

10. The aerial platform of claim 9, wherein said gripping mechanism includes a platform having moveable arms thereon for gripping the detector.

11. The aerial platform of claim 1 in combination with a controller for controlling the operation of the aerial platform, the controller being remote from the aerial platform.

12. The aerial platform claim 1, wherein the frame includes a first mounting location to which the gas delivery cup can be attached such that an open end of the gas delivery cup extends upwardly from the frame and the open end is above each of the blades of the drone, and a second mounting location to which the gas delivery cup can be attached such that the open end of the gas delivery cup extends radially outwardly from the blades of the drone.

13. The aerial platform claim 1, wherein the drone comprising a plurality of balloons or dirigible gas envelopes, at least one of said balloons or dirigible gas envelopes having a motor and rotatable blade attached thereto for flying the frame.

14. The aerial platform for servicing a detector comprising:
a frame;
a gas canister attached to the frame, the gas canister having gas therein;
a gas delivery cup attached to the frame and in fluid communication with the gas canister, wherein gas from the gas canister is capable of being selectively released into the gas delivery cup to test the detector; and
a drone attached to the frame, the drone capable of flying the frame under remote control by an operator to the detector, the drone comprising a plurality of balloons or dirigible gas envelopes, at least one of said balloons or dirigible gas envelopes having a motor and rotatable blade attached thereto for flying the frame.

15. The aerial platform claim 14, wherein the gas delivery cup has an open end that is radially outwardly from the blades of the drone.

16. The aerial platform claim 14, wherein the gas delivery cup has an open end that extends upwardly from the frame so that the open end is above each of the blades of the drone.

17. The aerial platform claim 14, wherein the frame includes a first mounting location to which the gas delivery cup can be attached such that an open end of the gas delivery cup extends upwardly from the frame and the open end is above each of the blades of the drone, and a second mounting location to which the gas delivery cup can be attached such that the open end of the gas delivery cup extends radially outwardly from the blades of the drone.

* * * * *